United States Patent
Ann et al.

(10) Patent No.: US 10,289,270 B2
(45) Date of Patent: May 14, 2019

(54) DISPLAY APPARATUS AND METHOD FOR DISPLAYING HIGHLIGHT THEREOF

(71) Applicant: SAMSUNG ELECTRONICS CO., LTD., Suwon-si (KR)

(72) Inventors: Woo-ram Ann, Yongin-si (KR); Tae-young Lee, Suwon-si (KR); Cheul-hee Hahm, Seongnam-si (KR); Jae-gil Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 14/796,316

(22) Filed: Jul. 10, 2015

(65) Prior Publication Data

US 2016/0011727 A1    Jan. 14, 2016

(30) Foreign Application Priority Data

Jul. 10, 2014 (KR) .......... 10-2014-0086719

(51) Int. Cl.
*G06F 3/0482* (2013.01)
*G06F 3/0484* (2013.01)

(52) U.S. Cl.
CPC ........ *G06F 3/0482* (2013.01); *G06F 3/04842* (2013.01); *G06F 2203/04801* (2013.01); *G09G 2340/045* (2013.01); *G09G 2340/0492* (2013.01)

(58) Field of Classification Search
CPC . G06F 3/0482; G06F 3/04845; G06F 3/04842
See application file for complete search history.

(56) References Cited

U.S. PATENT DOCUMENTS

| 2004/0119726 A1* | 6/2004 | Li ................ H04N 1/3871 345/629 |
| 2011/0109572 A1* | 5/2011 | Deslippe .......... G06F 3/03547 345/173 |
| 2013/0147830 A1 | 6/2013 | Kang |

(Continued)

FOREIGN PATENT DOCUMENTS

| CN | 103116490 A | 5/2013 |
| JP | 2008122800 A | 5/2008 |
| KR | 1020130066911 A | 6/2013 |

OTHER PUBLICATIONS

Marx, "A simple guide to 9-patch for Android UI", published: Mar. 18, 2011, radleymarx.com, http://radleymarx.com/blog/simple-guide-to-9-patch/.*

(Continued)

*Primary Examiner* — Seth A Silverman
(74) *Attorney, Agent, or Firm* — Sughrue Mion, PLLC

(57) ABSTRACT

A display apparatus and a method for displaying a highlight thereof are provided. The method for displaying a highlight on a display apparatus includes determining a shape and a size of a menu item selected by a user, determining a plurality of source images to be used to generate a highlight with respect to the menu item according to whether the highlight has symmetry based on the shape of the menu item, and generating the highlight with respect to the menu item by magnifying a size of the plurality of source images according to the size of the menu item and displaying the generated highlight.

12 Claims, 17 Drawing Sheets

SOURCE IMAGE     HIGHLIGHT CONFIGURATION ELEMENT

(56) References Cited

U.S. PATENT DOCUMENTS

2015/0220504 A1* 8/2015 Bocanegra Alvarez ..................... G06F 17/241
715/233

OTHER PUBLICATIONS

Marx, "A simple guide to 9-patch for Android UI", published: Mar. 18, 2011, radleymarx.com, http://radleymarx.com/blog/simple-guide-to-9-patch/ (Year: 2011).*
JiHyung Lee; "Nine-Patch Application", Nov. 5, 2011, Total 24 pages.

* cited by examiner

SOURCE IMAGE      HIGHLIGHT CONFIGURATION ELEMENT

SOURCE IMAGE    HIGHLIGHT CONFIGURATION ELEMENT

SOURCE IMAGE    HIGHLIGHT CONFIGURATION ELEMENT

| SOURCE IMAGE | HIGHLIGHT CONFIGURATION ELEMENT |

DISPLAY APPARATUS AND METHOD FOR DISPLAYING HIGHLIGHT THEREOF

CROSS-REFERENCE TO RELATED APPLICATION

This application claims priority from Korean Patent Application No. 10-2014-0086719, filed in the Korean Intellectual Property Office on Jul. 10, 2014, the entire disclosure of which is incorporated herein by reference in its entirety.

BACKGROUND

1. Field

Aspects of the exemplary embodiments relate to a display apparatus and a method for displaying a highlight thereof, and more particularly, to a display apparatus which generates and displays a highlight on a menu item selected by a user, and a method for displaying a highlight thereof.

2. Description of the Related Art

In order to provide a user with a User Interface (UI), a graphic-based operating system offers pre-defined UI toolkits at a platform level. Conventionally, the focus has been directed towards providing UIs by providing UI toolkits including features such as a button, a text box, and a list, but recently, an animation effect has been added to a UI configuration element to provide a user with more diverse User Experiences (UX). For example, a page flip, a window start and end animation, a highlight on a menu item, etc., are provided.

In particular, the highlight displayed on a menu item indicates a user's selection of a desired menu item from among a plurality of menu items, and may be moved between menu items in a direction input by the user. However, the recent menu items vary in their size and shape, so the highlight should be changed according to the size and shape of the menu item to which the highlight is moved. For example, as illustrated in FIG. 1A, if the highlight is moved from the first menu item 110 to the second menu item 120, the size and the shape of the highlight (e.g., the highlighted perimeter) should be changed to fit the size and shape of the second menu item 120. In addition, as illustrated in FIG. 1B, the depth of the highlight should not change even if the highlight moves between menu items in different sizes and shapes.

FIG. 1C illustrates an example of a screen to which an animation for increasing the size of a highlight when the highlight moves is applied. When the size of the highlight increases gradually, a display apparatus should generate 60 images per second in order to provide a smooth animation effect. That is, if the animation is played for 0.5 seconds, the display apparatus should generate 30 highlights in a row. In other words, the time for generating the highlight should be minimized in order to present a smooth animation.

However, the conventional nine-patch method uses a separate source image to generate a configuration element of a highlight at each side of a menu item, so the amount to be processed increases and thus the conventional nine-patch method takes considerable time to generate a highlight. Hereinafter, the method for generating a highlight using the conventional nine-patch method will be described with reference to FIGS. 2A to 2D.

FIG. 2A is a view provided to explain a highlight of which a size is changeable according to the nine-patch method. Herein, the feature the size of a highlight is changeable refers to the feature that the width and length of the square of the highlight are changeable according to the nine-patch method. The conventional nine-patch method divides the display area of the highlight into 9 sub areas. In this case, the areas of 1, 3, 7 and 9 are for displaying the corners of the highlight, the areas of 2 and 8 are for displaying the width of the highlight, the areas of 4 and 6 are for displaying the length of the highlight, and the area of 5 is for displaying a menu item. In particular, the highlight of the conventional nine-patch may extend in a left or right direction or in an up or down direction by applying different transformation in each sub area. In this case, the transformation methods may include coordinate translation, horizontal direction scale (or horizontal stretch), vertical direction scale (or vertical stretch), etc.

FIG. 2B is a view provided to explain a method for extending the width of a highlight according to the nine-patch method. To be specific, in order to extend the width of a highlight, the horizontal direction scale may be applied to the areas of 2 and 8 from among the areas constituting the highlight of the nine-patch method. In this case, only the coordinate translation can be applied to the areas excluding the areas of 2 and 8.

FIG. 2C is a view provided to explain a method for extending the length of a highlight according to the nine-patch method. To be specific, in order to extend the length of a highlight, the vertical direction scale may be applied to the areas of 4 and 6 from among the areas constituting the highlight of the nine-patch method. In this case, only the coordinate translation can be applied to the areas excluding the areas of 4 and 6.

As described above, in order to represent a highlight according to the nine-patch method, a total of 8 source images are required. To be specific, in order to represent a highlight according to the nine-patch method, 4 source images are required for the corners of the highlight, and 4 source images are required for the sides of the highlight. However, no source image is required for the area of 5 as a menu item is displayed in the area of 5.

FIG. 2D is a view provided to explain a method for representing a highlight according to the nine-patch method. First of all, the upper side is drawn by extending the first source image in the horizontal direction, and the lower side is drawn by extending the second source image in the horizontal direction. The left side is drawn by extending the third source image in the vertical direction and the right side is drawn by extending the fourth source image in the vertical direction. The 4 corners are drawn by using the fifth to the eighth source images.

As described above, if a plurality of source images are used to draw each side and each corner, the same scale computation needs to be applied to the area having the same shape twice (for example, the areas of 2 and 8) and thus, the amount of computation increases. In addition, a total of 8 images should be stored in order to draw a highlight and thus, the storage space of a memory may be taken up unnecessarily, thereby increasing the amount of resources used.

SUMMARY

An aspect of the exemplary embodiments relates to a display apparatus which may reduce the amount of computation and memory usage for representing a highlight, and a method for displaying a highlight thereof.

According to an aspect of an exemplary embodiment, there is provided a method for displaying a highlight of a display apparatus, the method including determining a shape and a size of a menu item selected by a user, determining a plurality of source images to be used to generate a highlight with respect to the menu item according to whether the highlight has symmetry based on the shape of the menu item, and generating the highlight with respect to the menu item by magnifying a size of the plurality of source images according to the size of the menu item and displaying the generated highlight.

The determining of the plurality of source images may include determining a source image, among the plurality of source images, to be used to generate a highlight configuration element at sides of the menu item facing each other when the highlight has symmetry.

In response to a shape of the menu item being a square, the determining of the plurality of source images may include determining a first source image to be used to generate highlight configuration elements at four sides of the menu item, and determining a second source image to be used to generate highlight configuration elements at corners of the menu item.

The generating may include generating a first highlight configuration element at a first side of the menu item by magnifying the first source image along a length of the first side of the menu item, generating a second highlight configuration element at a second side of the menu item by magnifying and rotating the first source image according to a first angle, generating a third highlight configuration element at a third side of the menu item by magnifying and rotating the first source image according to a second angle, and generating a fourth configuration element at a fourth side of the menu item by magnifying and rotating the first source image according to a third angle.

In response to a shape of the menu item being a rectangle, the determining of the plurality of source images may include determining a first source image to be used to generate highlight configuration elements at four sides of the menu item, and determining a second source image to be used to generate highlight configuration elements at corners of the menu item.

The generating may include generating a first highlight configuration element at a first horizontal side of the menu item by magnifying the first source image along a width of the menu item, generating a second highlight configuration element at a second horizontal side of the menu item by magnifying and rotating the first source image according to a first angle, generating a third highlight configuration element at a first vertical side of the menu item by magnifying and rotating the first source image according to a second angle and according to a length of the menu item, and generating a fourth highlight configuration element at a second vertical side of the menu item by magnifying and rotating the first source image according to a third angle.

In response to a shape of the menu item being a rectangle, the determining of the plurality of source images may include determining a first source image to be used to generate highlight configuration elements at horizontal sides of the menu item, determining a second source image to be used to generate highlight configuration elements at vertical sides of the menu item, and determining a third source image to be used to generate highlight configuration elements at corners of the menu item.

The generating may include generating a first highlight configuration element at a first horizontal side of the menu item by magnifying the first source image along a width of the menu item, generating a second highlight configuration element at a second horizontal side of the menu item by magnifying and rotating the first source image according to a first angle, generating a third highlight configuration element at a first vertical side of the menu item by magnifying and rotating the second source image according to a second angle along a length of the menu item, and generating a fourth highlight configuration element at a second vertical side of the menu item by magnifying and rotating the second source image according to a third angle.

The generating may include copying the plurality of source images according to the size of the menu item and generating a highlight configuration element according to the copied plurality of source images.

According to another aspect of an exemplary embodiment, there is provided a display apparatus including an inputter configured to receive a user command to select a menu item, and a controller configured to determine a shape and a size of the menu item, determine a plurality of source images to be used to generate a highlight to be displayed with respect to the menu item according to whether the highlight has symmetry based on the shape of the menu item, generate the highlight with respect to the menu item by magnifying a size of the plurality of source images according to the size of the menu item, and control a display to display the generated highlight.

The controller may be configured to determine a source image, among the plurality of source images, to be used to generate a highlight configuration element at sides of the menu item facing each other when the highlight has symmetry.

The controller, in response to a shape of the menu item being a square, may be configured to determine a first source image to be used to generate highlight configuration elements at four sides of the menu item, and determine a second source image to be used to generate highlight configuration elements at corners of the menu item.

The controller may be configured to generate a first highlight configuration element at a first side of the menu item by magnifying the first source image along a length of one side of the menu item, generate a second highlight configuration element at a second side of the menu item by magnifying and rotating the first source image according to a first angle, generate a third highlight configuration element at a third side of the menu item by magnifying and rotating the first source image according to a second angle, and generate a fourth configuration element at a fourth side of the menu item by magnifying and rotating the first source image according to a third angle.

The controller, in response to a shape of the menu item being a rectangle, may be configured to determine a first source image to be used to generate highlight configuration elements at four sides of the menu item, and determine a second source image to be used to generate highlight configuration elements at corners of the menu item.

The controller may be configured to generate a first highlight configuration element at a first horizontal side of the menu item by magnifying the first source image along a width of the menu item, generate a second highlight configuration element at a second horizontal side of the menu item by magnifying and rotating the first source image according to a first angle, generate a third highlight configuration element at a first vertical side of the menu item by magnifying and rotating the first source image according to a second angle and according to a length of the menu item, and generate a fourth highlight configuration element at a second vertical side of the menu item by magnifying and rotating the first source image according to a third angle.

The controller, in response to a shape of the menu item being a rectangle, may be configured to determine a first source image to be used to generate highlight configuration elements at horizontal sides of the menu item, determine a second source image to be used to generate highlight configuration elements at vertical sides of the menu item, and determine a third source image to be used to generate highlight configuration elements at corners of the menu item as a third source image.

The controller may be configured to generate a first highlight configuration element at a first vertical side of the menu item by magnifying the first source image along a length of the menu item, generate a second highlight configuration element at a second vertical side of the menu item by magnifying and rotating the first source image according to a first angle, generate a third highlight configuration element at a first horizontal side of the menu item by magnifying and rotating the second source image according to a second angle along a width of the menu item, and generate a fourth highlight configuration element at a second horizontal side of the menu item by magnifying and rotating the second source image according to a third angle.

The controller may be configured to copy the plurality of source images according to a size of the menu item and generate a highlight configuration element according to the copied plurality of source images.

As described above, according to the various exemplary embodiments, the amount of computation and memory usage to generate a highlight according to a nine-patch method may be reduced remarkably.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION

Figure 1A:
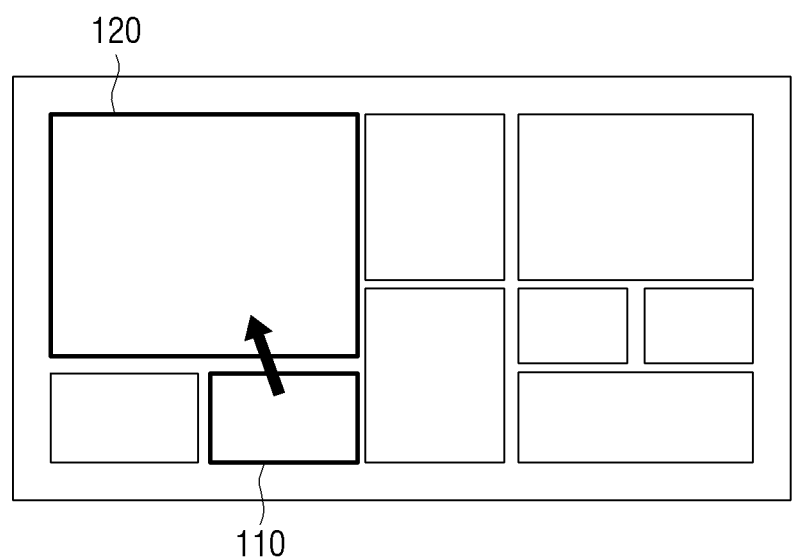
FIGS. 1A, 1B, 1C, 2A, 2B, 2C and 2D are views provided to explain a related art method for displaying a highlight.
Figure 1B:
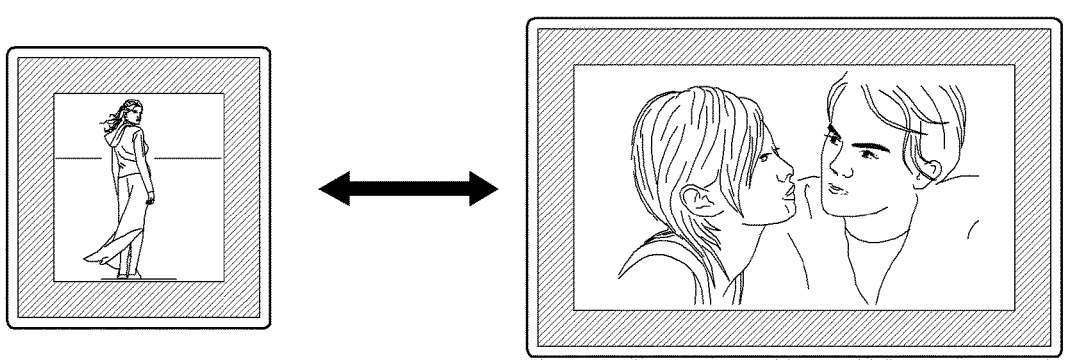
Figure 1C:
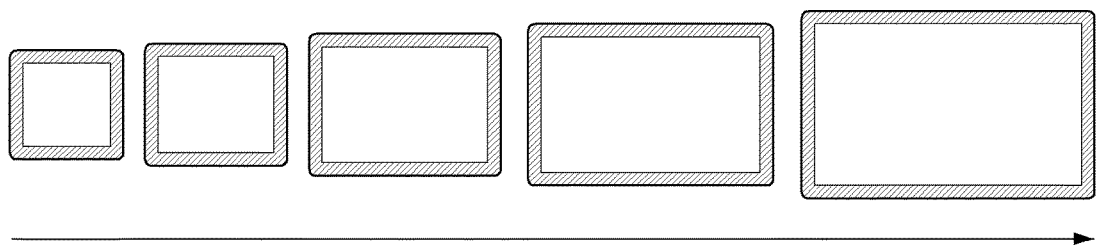
Figure 2A:
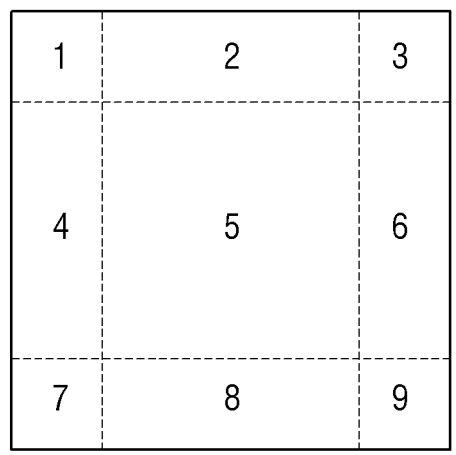
Figure 2B:
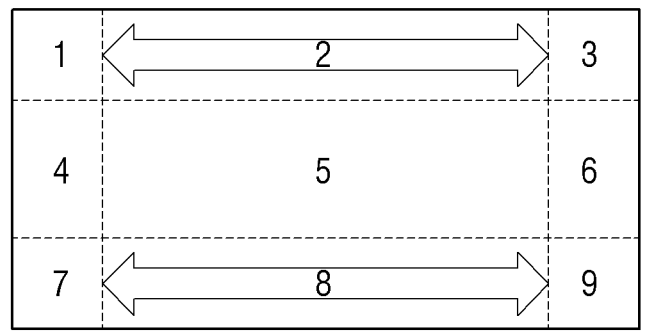
Figure 2C:
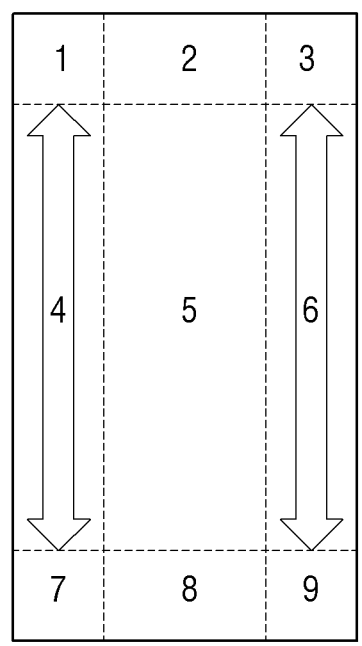
Figure 2D:
Figure 2D:
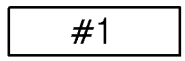
Figure 2D:
Figure 2D:
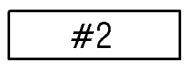
Figure 2D:
Figure 2D:
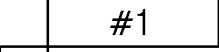
Figure 2D:
Figure 2D:
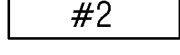
Figure 2D:
Figure 2D:
Figure 2D:
Figure 2D:
Figure 2D:
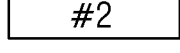
Figure 2D:
Figure 2D:

Hereinafter, exemplary embodiments will be described in detail with reference to accompanying drawings. In the following description, the same reference numerals are used for analogous elements when the reference numerals are depicted in different drawings. The matters defined in the description, such as a detailed construction and elements, are provided to assist in a comprehensive understanding of exemplary embodiments. Thus, it is apparent that exemplary embodiments can be carried out without those specifically defined matters. Also, functions or elements known in the related art are not described in detail since a detailed description would obscure the exemplary embodiments with unnecessary detail.

Figure 3:
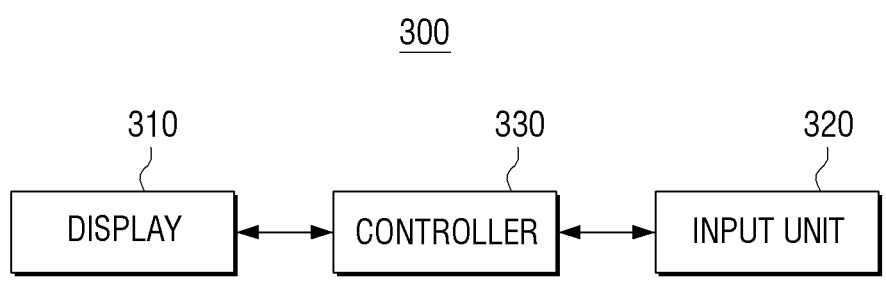
FIG. 3 is a block diagram illustrating a configuration of a display apparatus according to an exemplary embodiment.

FIG. 3 is a block diagram illustrating a configuration of a display apparatus 300 according to an exemplary embodiment. As illustrated in FIG. 3, the display apparatus 300 includes a display 310, an input unit 320 and a controller 330. In this case, the display apparatus 300 may be a smart television, but this implementation is only an example. The display apparatus 300 may be realized as various types of display apparatuses such as a projection television, a desktop PC, a notebook PC, etc.

The display 310 displays various types of image data and/or UIs. In particular, the display 310 may display at least one menu item, and display a highlight on a menu item which is selected by a user from among the at least one menu item.

The input unit 320 receives a user command to control the display apparatus 300. In particular, the input unit 320 may receive a user command to move or display a highlight on one of a plurality of menu items.

The controller 330 controls the overall functions of the display apparatus 300 according to the input user command.

In particular, the controller 330 determines the shape and size of the menu item selected by a user, determines a plurality of source images to generate a highlight with respect to the selected menu item according to symmetry between the shape of the menu item and the highlight, and controls the display 320 to magnify the size of the plurality of source images according to the size of the menu item and display the highlight regarding the menu item.

Specifically, the controller 330 determines whether the highlight to be displayed on the menu item which is selected by a user has symmetry. If the highlight has symmetry, the controller 330 may determine the source image for generating the configuration element of the highlight at the side which is symmetrical to the menu item as the same source image. For example, if the horizontal side of the highlight is symmetrical, the controller 330 may determine the source image for generating the horizontal side as the same source image.

In an exemplary embodiment, if the shape of a menu item is a square, and the configuration elements of a highlight at the four sides of the menu item are the same, thereby having symmetry, the controller 330 may determine the source image of the highlight configuration element at the four sides of the menu item as the first source image, and the source image of the highlight configuration element at the corners of the menu item as the second source image.

In addition, the controller 330 may generate a first highlight configuration element at the first side of the menu item by magnifying the first source image along the length of one side of the menu item in the regular square shape, generate a second highlight configuration element at the second side of the menu item by magnifying the first source image and rotating the magnified first source image as much as a first angle, generate a third highlight configuration element at the third side of the menu item by magnifying the first source image and rotating the magnified first source image as much as a second angle, and generate the fourth highlight configuration element at the fourth side of the menu item by magnifying the first source image and rotating the magnified first source image as much as the third angle. In addition, the controller 330 may generate fifth, sixth, seventh and eighth highlight configuration elements at the four corners of the menu item using the second source image. The controller 330 may read out the first to the eighth highlight configuration elements at the menu item selected by a user and display a highlight.

In another example, if the shape of the menu item is a rectangle and the highlight configuration elements at the four sides of the menu item have symmetry, in other words, have the same shape, the controller 330 may determine the source image of the highlight configuration elements at the four sides of the menu item as the first source image, and the source image of the highlight configuration elements at the corners of the menu item as the second source image.

The controller 330 may generate the first highlight configuration element at the first horizontal side of the menu item by magnifying the first source image along the width of the menu item in the form of a rectangle, generate the second highlight configuration element at the second horizontal side of the menu item by magnifying the first source image and rotating the magnified first source image as much as the first angle, generate the third highlight configuration element at the first vertical side of the menu item by magnifying the first source image and rotating the magnified first source image as much as the second angle along the length of the menu item in the form of rectangle, and generate the fourth highlight configuration element at the second vertical side of the menu item by magnifying the first source image and rotating the magnified first source image as much as the third angle. In addition, the controller 330 may generate the fifth to the eighth highlight configuration elements at the four corners of the menu item using the second source image. The controller 330 may read out the first to the eighth configuration elements at the menu item selected by a user and display a highlight.

In another example, if the shape of the menu item is a rectangle, the highlight configuration elements at the horizontal sides out of the four sides of the menu item have the same shape, and the highlight configuration elements at the vertical side out of the four sides of the menu item have the same shape, the controller 330 may determine the source image of the highlight configuration elements at the horizontal sides of the menu item as the first source image, determine the source image of the highlight configuration elements at the vertical sides of the menu item as the second source image, and determine the source image of the highlight configuration elements at the corners of the menu item as the third source image.

In addition, the controller 330 may generate the first highlight configuration element at the first horizontal side of the menu item by magnifying the first source image along the width of the menu item in the form of rectangle, generate the second highlight configuration element at the second horizontal side of the menu item by magnifying the first source image and rotating the magnified first source image as much as the first angle, generate the third highlight configuration element at the first vertical side of the menu item by magnifying the second source image and rotating the magnified second source image as much as the second angle along the length of the menu item in the form of rectangle, and generate the fourth highlight configuration element at the second vertical side of the menu item by magnifying the second source image and rotating the magnified second source image as much as the third angle. The controller 330 may generate the fifth to the eighth highlight configuration elements at the four corners of the menu item using the second source image. In addition, the controller 330 may read out the first to the eighth highlight configuration elements at the menu item selected by a user and display a highlight.

The controller 330 may generate highlight configuration elements by copying a plurality of source images according to the size of the menu item. In addition, the controller 330 may set the direction of reading and writing source images differently and rotate the source images.

As described above, a highlight may be generated using the symmetry of the highlight and thus, the amount of computation and the memory usage required for displaying a highlight may be reduced remarkably.

Figure 4:
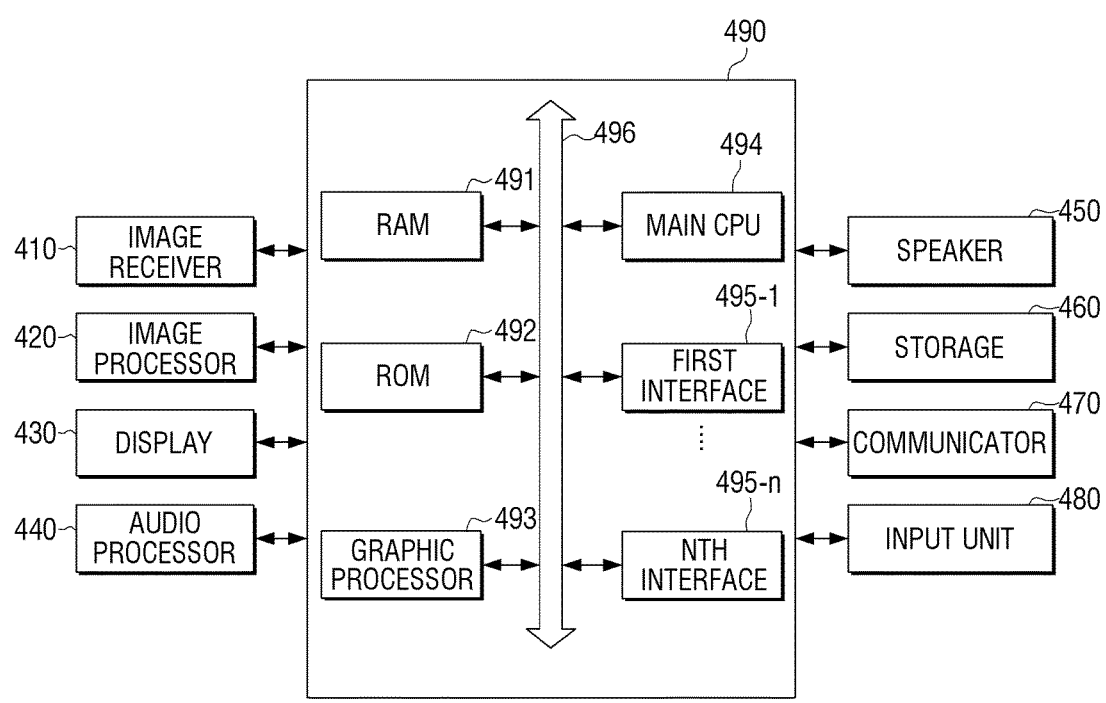
FIG. 4 is a block diagram illustrating a detailed configuration of a display apparatus according to an exemplary embodiment.

Hereinafter, the method of displaying a highlight in the display apparatus 100 will be described in greater detail with reference to FIGS. 4 to 8B. FIG. 4 is a block diagram illustrating a configuration of a display apparatus 400 in detail according to an exemplary embodiment. As illustrated in FIG. 4, the display apparatus 400 includes an image receiver 410, an image processor 420, a display 430, an audio processor 440, a speaker 450, a storage 460, a communicator 470, an input unit 480 (e.g., inputter), and a controller 490.

The image receiver 410 receives image data through various sources. For example, the image receiver 410 may receive broadcast data from an external broadcast station, may receive image data from an external apparatus (for example, a DVD device), and may receive stream image data from an external server.

The image processor 420 performs image processing with respect to image data received from the image receiver 410. The image processor 420 may perform various image processing operations such as decoding, scaling, noise filtering, frame rate conversion, resolution conversion, etc., with respect to image data.

The display 430 displays at least one of an image frame which has been generated by processing image data received from the image receiver 410 by the image processor 420 and various objects generated by a graphic processor 493. In particular, the display 430 may display a plurality of menu items, and display a highlight on at least one of the plurality of menu items.

The audio processor 440 performs processing with respect to audio data. The audio processor 440 may perform various processing operations such as decoding, amplification, noise filtering, etc., with respect to audio data.

The speaker 450 may output not only various types of audio data processed by the audio processor 440 but also various alarm sounds and a voice message.

The storage 460 stores various modules to drive the display apparatus 400. For example, the storage 460 may store various types of software including, for example, a base module, a sensing module, a communication module, a presentation module, a web browser module, and a service module. In this case, the base module refers to a basic module which processes a signal transmitted from each piece of hardware included in the display apparatus 400, and transmits the processed signal to an upper layer module. The sensing module is a module which collects information from various sensors, and analyzes and manages the collected information. The sensing module may include a face recognition module, a voice recognition module, a motion recognition module, an NFC recognition module, and so on. The presentation module is a module to compose a display screen. The presentation module includes a multimedia module for reproducing and outputting multimedia contents, and a UI rendering module for UI and graphic processing. The communication module is a module to perform communication with outside. The web browser module refers to a module which accesses a web server by performing web-browsing. The service module is a module including various applications for providing various services.

As described above, the storage 460 may include various program modules, but some of the modules may be omitted or changed, or new modules may be added depending on the type and characteristics of the display apparatus 400. For example, if the display apparatus 400 is realized as a tablet PC, the base module may further include a location determination module to determine a GPS-based location, and the sensing module may further include a sensing module to detect a user's operation.

In addition, the communicator 470 may communicate with various types of external apparatuses according to various types of communication methods. The communicator 470 may include various communication chips such as a WiFi chip, a Bluetooth chip, a Near Field Communication (NFC) chip, and a wireless communication chip. Herein, the WiFi chip, the Bluetooth chip, and the NFC chip perform communication according to a WiFi method, a Bluetooth method and an NFC method, respectively. The NFC chip represents a chip which operates according to an NFC method which uses a 13.56 MHz band among various RF-ID frequency bands such as 135 kHz, 13.56 MHz, 433 MHz, 860~960 MHz, 2.45 GHz, and so on. In the case of the WiFi chip or the Bluetooth chip, various types of connection information such as an SSID and a session key may be initially transmitted or received to establish a communication connection, and then, various types of information may be transmitted or received. The wireless communication chip represents a chip which communicates according to various communication standards such as IEEE, Zigbee, 3rd Generation (3G), 3rd Generation Partnership Project (3GPP), Long Term Evolution (LTE) and so on.

The input unit 480 receives various types of user commands to control the display apparatus 400. In particular, the input unit 480 may receive a user command to display a highlight on one of a plurality of menu items, a user command to move a highlight, and a user command to select a menu item which is highlighted on the display 430.

In an exemplary embodiment, the input unit 480 may be realized as a remote controller, but this implementation is only an example, and the input unit 480 may be realized as various types of input devices such as a touch point, a pointing device motion recognition apparatus, a voice recognition apparatus, a keyboard, a mouse, etc.

The controller 490 controls overall operations of the display apparatus 400 using various types of programs stored in the storage 460.

As illustrated in FIG. 4, the controller 490 includes a RAM 491, a ROM 492, a graphic processor 493, a main CPU 494, a first to an nth interface 495-1~495-n, and a bus 496. The RAM 491, the ROM 492, the graphic processor 493, the main CPU 494, and the first to the nth interface 495-1~495-n may be interconnected through the bus 496.

The ROM 492 stores a set of commands for system booting. If a turn-on command is input and thus, power is supplied, the main CPU 494 copies O/S stored in the storage 460 into the RAM 491 according to a command stored in the ROM 492, and boots a system by executing the O/S. Once the booting is completed, the main CPU 494 copies various application programs stored in the storage 460 into the RAM 491, and performs various operations by executing the application programs copied into the RAM 491.

The graphic processor 493 generates a screen including various types of objects such as an icon, an image, a text, etc., using an operation part (not shown) and a rendering part (not shown). The operation part computes property values such as coordinates, a shape, a size, and a color of each of the objects to be displayed according to the layout of a screen using a control command received from the input part 480. The rendering part generates screens of various layouts including objects based on the property values computed by the operation part. The screens generated by the rendering part are displayed in a display area of the display 430.

The main CPU 494 accesses the storage 460 and performs booting using the O/S stored in the storage 460. In addition, the main CPU 494 performs various operations using various programs, contents, data, etc., stored in the storage 460.

The first to the nth interface 495-1 to 495-n are connected to the above-described various components. One of the interfaces may be a network interface which is connected to an external apparatus via network.

In particular, the controller 490 may determine the shape and size of a menu item which is selected according to a user command input through the input unit 480. In addition, the controller 490 may determine a plurality of source images to generate a highlight regarding the selected menu item according to the shape of the menu item and the symmetry of the highlight. Subsequently, the controller 490 may control the display 430 to display a highlight regarding the menu item by magnifying the size of the plurality of source images according to the size of the menu item.

Specifically, the controller 490 may determine the shape and size of a menu item selected by a user. In this case, the shape of the menu item may be one of a regular square and a rectangle, but this implementation is only an example. The menu item may be realized as various other figures (for example, a triangle or a trapezoid).

The controller 490 may determine whether the highlight has symmetry. According to an exemplary embodiment, the highlight has symmetry when the shape of the highlight configuration elements constituting the highlight is the same.

If the highlight has symmetry, the controller 490 may determine a source image to generate a highlight configuration element at the symmetrical side of the menu item as the same source image. For example, if the highlight configuration elements at the horizontal sides of the menu item in the form of a rectangle have symmetry, in other words, have the same shape, the controller 490 may determine a source image to generate the highlight configuration elements at the horizontal sides of the menu item as the same source image. In addition, the controller 490 may determine a corner source image to generate the highlight configuration element at the corner of the menu item.

Figure 5:
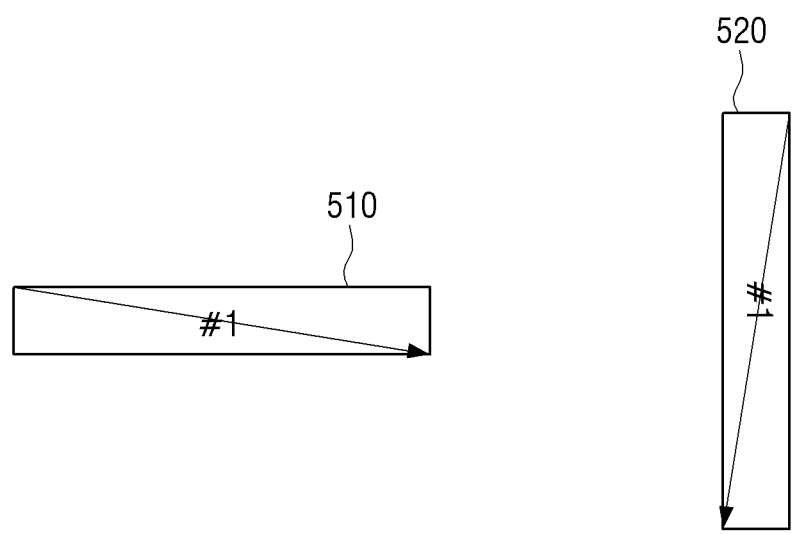
FIGS. 5, 6A, 6B, 7A, 7B, 8A and 8B are views provided to explain a method for displaying a highlight according to various exemplary embodiments.

The controller 490 may generate a highlight configuration element by magnifying and rotating the determined source image according to the size of the menu item. The controller 490 may copy the determined source image as large as the size of the menu item and generate a highlight configuration element in order to prevent deterioration of the image of the highlight. In addition, the controller 490 may generate a highlight configuration element by setting a reading direction and a writing direction differently and rotating a source image. Specifically, if a figure is rotated at a certain angle (for example, 37°, 101°, etc.), a complicated computation process is required. However, if a figure is rotated at 90°, 180°, and 270°, computation may be performed with a simple coordinates operation. In other words, as illustrated in FIG. 5, if data is read in the direction of the arrow 510 and written in the direction of 520, a source image may be rotated at 90°.

In addition, the controller 490 may generate a highlight regarding a menu item by combining highlight configuration elements which are generated at the location of the menu item.

Figure 6A:
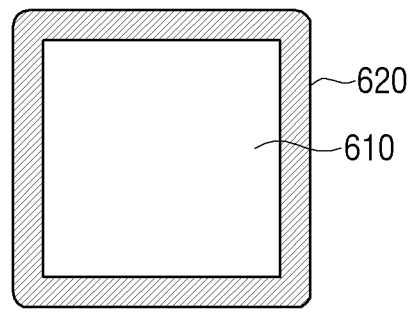
Figure 6B:
Figure 6B:
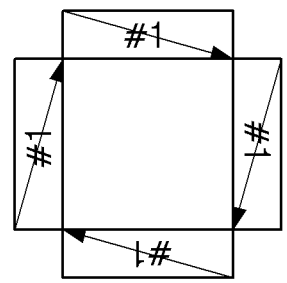
Figure 6B:
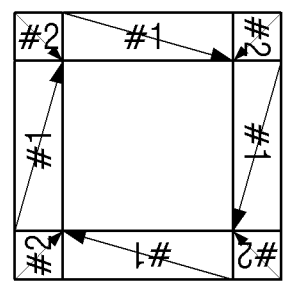

Hereinafter, the method for generating a highlight according to various exemplary embodiments will be described with reference to FIGS. 6A to 8D. FIGS. 6A to 6B are views provided to explain a method for generating a highlight regarding a menu item in the form of a rectangle, according to an exemplary embodiment.

First of all, as illustrated in FIG. 6A, a highlight 620 generated with respect to a menu item 610 in the form of a rectangle has symmetry, as the up, down, left, and right sides of the highlight 620 have the same shape.

As illustrated in FIG. 6A, if the shape of the menu item 610 is a rectangle, and all of the highlight configuration elements at four sides of the menu item 610 have symmetry, in other words, have the same shape, the controller 490 may determine a source image of highlight configuration elements at four sides of the menu item 610 as a first source image, and may determine a source image of highlight configuration elements at corners of the menu item 610 as a second source image.

As illustrated in FIG. 6B, the controller 490 may generate a first highlight configuration element at an upper side of the menu item 610 by magnifying the first source image to be as long as the length of one side of the menu item 610 in the form of a rectangle. The controller 490 may generate a second highlight configuration element at a right side of the menu item 610 by magnifying the first source image to be as long as the length of one side of the menu item 610 and rotating the first source image as much as 90°. The controller 490 may generate a third highlight configuration element at a lower side of the menu item 610 by magnifying the first source image to be as long as the length of one side of the menu item 610 and rotating the first source image as much as 180°. The controller 490 may generate a fourth highlight configuration element at a left side of the menu item 610 by magnifying the first source image to be as long as the length of one side of the menu item 610 and rotating the first source image as much as 270°.

The controller 490 may generate a fifth highlight configuration element at a corner in the upper left end using the second source image. The controller 490 may generate a sixth highlight configuration element at a corner in the upper right end using the second source image. The controller 490 may generate a seventh highlight configuration element at a corner in the lower right end using the second source image. The controller 490 may generate an eighth highlight configuration element at a corner in the lower left end using the second source image.

The controller 490 may generate the highlight 620 which is displayed in the menu item 610 in the form of a rectangle by combining four highlight configuration elements corresponding to the corners along with the first to the fourth highlight configuration elements which are generated.

Figure 7A:
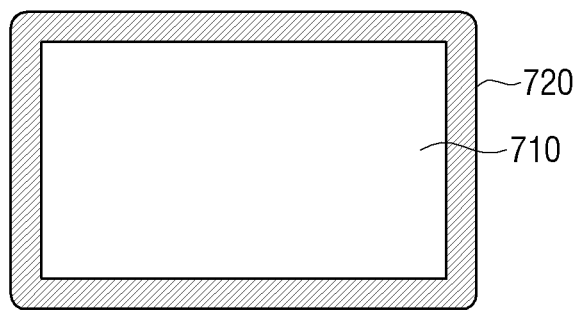
Figure 7B:
Figure 7B:
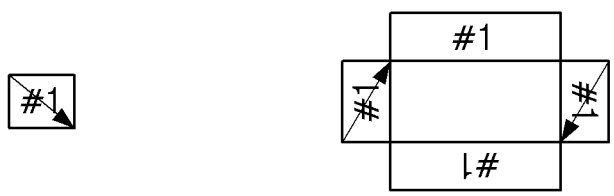
Figure 7B:
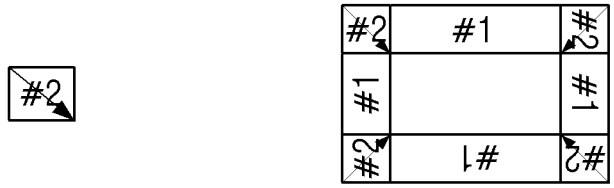

FIGS. 7A and 7B are views provided to describe a method for generating a highlight with respect to a menu item in the form of a rectangle according to an exemplary embodiment.

First of all, as illustrated in FIG. 7A, a highlight 720 generated in a menu item 710 in the form of a rectangle has symmetry as the up, down, left, and right sides of the highlight 720 have the same shape.

As illustrated in FIG. 7A, if the shape of the menu item 710 is a rectangle, and all of the highlight configuration elements at four sides of the menu item 710 have symmetry, in other words, have the same shape, the controller 490 may determine a source image of highlight configuration elements at four sides of the menu item 710 as a first source image, and may determine a source image of highlight configuration elements at corners of the menu item 710 as a second source image.

As illustrated in FIG. 7B, the controller 490 may generate a first highlight configuration element at an upper side of the menu item 710 by magnifying the first source image along a width of the menu item 710 in the form of a rectangle. The controller 490 may generate a second highlight configuration element at a lower side of the menu item 710 by magnifying the first source image to be as long as the length of one side of the menu item 710 and rotating the first source image as much as 180°. The controller 490 may generate a third highlight configuration element at a right side of the menu item 710 by magnifying the first source image along the length of the menu item 710 and rotating the first source image as much as 90°. The controller 490 may generate a fourth highlight configuration element at a left side of the menu item 710 by magnifying the first source image and rotating the first source image as much as 270°.

The controller 490 may generate a fifth highlight configuration element at a corner in the upper left end using the second source image. The controller 490 may generate a sixth highlight configuration element at a corner in the upper right end using the second source image. The controller 490 may generate a seventh highlight configuration element at a corner in the lower right end using the second source image. The controller 490 may generate an eighth highlight configuration element at a corner in the lower left end using the second source image.

The controller 490 may generate the highlight 720 which is displayed in the menu item 710 in the form of a rectangle by combining four highlight configuration elements corresponding to the corners along with the first to the fourth highlight configuration elements which are generated.

Figure 8A:
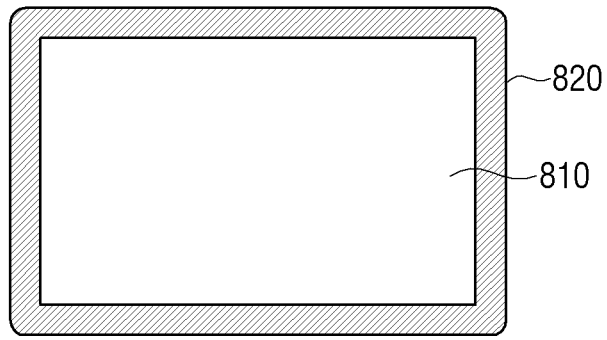
Figure 8B:
Figure 8B:
Figure 8B:
Figure 8B:
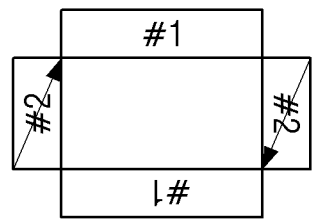
Figure 8B:
Figure 8B:
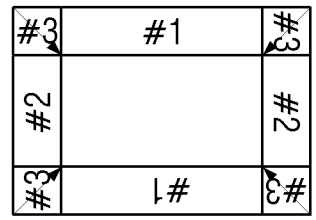

FIGS. 8A and 8B are views provided to describe a method for generating a highlight with respect to a menu item in the form of a rectangle according to another exemplary embodiment.

First of all, as illustrated in FIG. 8A, a highlight 820 generated in a menu item 810 in the form of rectangle has symmetry as the upper side and lower side of the highlight 820 have the same shape and the left side and right side of the highlight 820 have the same shape.

As illustrated in FIG. 8A, if the shape of the menu item 810 is a rectangle, and all of the highlight configuration elements at four sides of the menu item 810 have symmetry, in other words, have the same shape, the controller 490 may determine a source image of highlight configuration elements at horizontal sides of the menu item 810 as a first source image, determine a source image of highlight configuration elements at vertical sides of the menu item 810 as a second source image, and determine a source image of highlight configuration elements at corners of the menu item 810 as a third source image.

The controller 490 may generate a first highlight configuration element at an upper side of the menu item 810 by magnifying the first source image along a width of the menu item 810 in the form of a rectangle. The controller 490 may generate a second highlight configuration element at a lower side of the menu item 810 by magnifying the first source image and rotating the first source image as much as 180°. The controller 490 may generate a third highlight configuration element at a right side of the menu item 810 by magnifying the second source image along the length of the menu item 810 and rotating the second source image as much as 90°. The controller 490 may generate a fourth highlight configuration element at a left side of the menu item 810 by magnifying the second source image and rotating the second source image as much as 270°.

The controller 490 may generate a fifth highlight configuration element at a corner in the upper left end using the third source image. The controller 490 may generate a sixth highlight configuration element at a corner in the upper right end using the third source image. The controller 490 may generate a seventh highlight configuration element at a corner in the lower right end using the third source image. The controller 490 may generate an eighth highlight configuration element at a corner in the lower left end using the third source image.

The controller 490 may generate the highlight 820 which is displayed in the menu item 810 in the form of a rectangle by combining four highlight configuration elements corresponding to the corners along with the first to the fourth highlight configuration elements which are generated.

According to the above-described exemplary embodiment, if a highlight has symmetry, the highlight configuration elements in the area with symmetry are generated using the same source image and thus, the amount of computation and memory usage may be reduced.

According to the above exemplary embodiment, the sides facing each other have symmetry as when the sides facing each other have the same shape, but this implementation is only an example. Alternatively, the sides may be considered to have symmetry as when adjacent sides have the same shape. For example, if highlight configuration elements at the upper side and the right side of a menu item are the same, and highlight elements at the lower side and the left side of the menu item are the same, the same source image may be used to generate the highlight configuration elements at the upper side and the right side of the menu item, and the same source image may be used to generate the highlight configuration elements at the lower side and the left side of the menu item.

Figure 9:
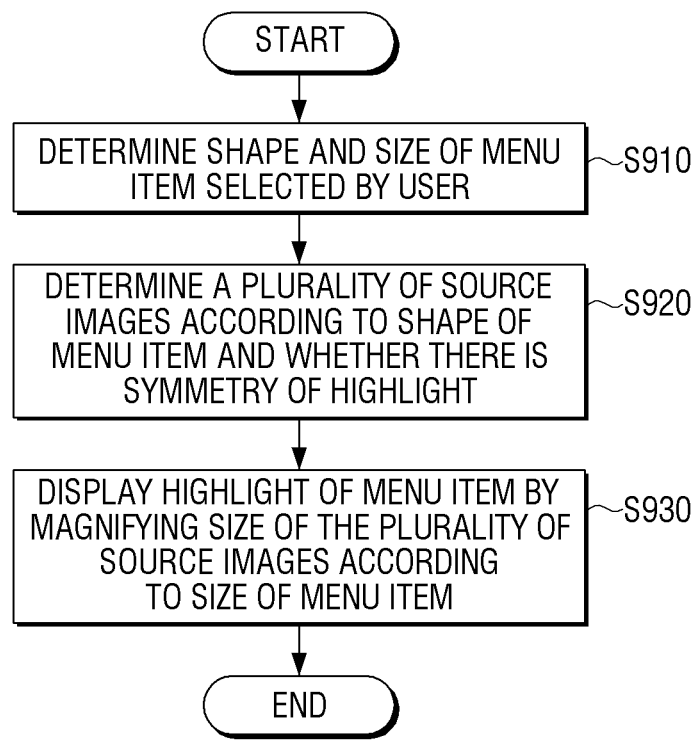
FIG. 9 is a flowchart provided to explain a method for displaying a highlight on a display apparatus according to an exemplary embodiment.

Hereinafter, a method for displaying a highlight of a display apparatus 300 will be described with reference to FIG. 9.

First of all, the display apparatus 300 determines the shape and the size of a menu item selected by a user at operation S910).

The display apparatus 300 determines a plurality of source images according to the shape of the menu item and further determines whether the highlight has symmetry at operation S920. In this case, if is the highlight has symmetry, the display apparatus 300 may determine a source image to generate highlight configuration elements at the symmetrical sides to be the same source image.

Subsequently, the display apparatus 300 displays a highlight regarding the menu item by magnifying the plurality of source images according to the size of the menu item at operation S930. In this case, the display apparatus 300 may copy the source images according to the size of the menu item and magnify the size of the source images.

As described above, according to the method for displaying a highlight, the amount of computation and memory usage to generate a highlight based on a nine-patch method may be reduced remarkably.

The method for displaying a highlight of a display apparatus according to the above-described various exemplary embodiments may be realized as a program and provided in a display apparatus or in an input apparatus. In particular, the program including a method for controlling a display apparatus according to exemplary embodiments may be stored in a non-transitory computer readable medium and provided therein.

According to an exemplary embodiment, the non-transitory computer readable medium refers to a medium which may store data semi-permanently rather than storing data for a short time, and may, for example, be implemented as a register, a cache, and a memory and may be readable by an apparatus. Specifically, the above-described various applications or programs may be stored in a non-transitory recordable medium such as a CD, DVD, hard disk, Blu-ray disk, USB, memory card, ROM, etc., and provided therein.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for displaying a highlight on a display apparatus, comprising:
    displaying a plurality of polygonal menu items;
    receiving a user input selecting a polygonal menu item among the plurality of polygonal menu items;
    selecting a first polygonal menu item among the plurality of polygonal menu items based on the user input;
    determining a first source image, from among a plurality of source images, to be used to generate a highlight image surrounding the first polygonal menu item based on a shape of the first polygonal menu item; and
    generating a first highlight configuration element corresponding to a first side of the first polygonal menu item by magnifying the first source image along a length of the first side;
    generating a second highlight configuration element corresponding to a second side of the first polygonal menu item by rotating the first source image according to a direction of the second side and magnifying the first source image along a length of the second side;
    generating the highlight image based on the first highlight configuration element and the second highlight configuration element;
    displaying the highlight image surrounding the first polygonal menu item; and in response to a user input selecting a second polygonal menu item among the plurality of polygonal menu items, no longer displaying the highlight image surrounding the first polygonal menu item.

2. The method as claimed in claim 1, wherein highlight configuration elements at sides of the polygonal menu item facing each other are generated from a same source image, from among the plurality of source images, when the polygonal menu item has symmetry.

3. The method as claimed in claim 1, wherein when a shape of the first polygonal menu item is a square, the generating the highlight image further comprises generating a third highlight configuration element corresponding to a third side of the first polygonal menu item and a fourth highlight configuration element corresponding to a fourth side of the first polygonal menu item using the first source image, and
    wherein the method further comprises generating highlight configuration elements at corners of the polygonal menu item using a second source image.

4. The method as claimed in claim 3, wherein the generating the highlight image further comprises generating the third highlight configuration element corresponding to the third side of the first polygonal menu item by magnifying the first source image and rotating the first source image according to a direction of the third side, and generating the fourth configuration element corresponding to the fourth side of the first polygonal menu item by magnifying the first source image and rotating the first source image according to a direction of the fourth side.

5. The method as claimed in claim 1, wherein when a shape of the first polygonal menu item is a rectangle, the generating the highlight image further comprises generating a third highlight configuration element corresponding to a third side of the first polygonal menu item and a fourth highlight configuration element corresponding to a fourth side of the first polygonal menu item using the first source image, and wherein the method further comprises generating highlight configuration elements at corners of the polygonal menu item using a second source image.

6. The method as claimed in claim 5, wherein the generating the highlight image further comprises generating the third highlight configuration element corresponding to the third side of the first polygonal menu item by magnifying the first source image and rotating the first source image according to a direction of the third side, and generating the fourth highlight configuration element corresponding to the fourth side of the first polygonal menu item by magnifying the first source image and rotating the first source image according to direction of the fourth side.

7. A display apparatus, comprising:
a display;
an inputter configured to receive a user command; and
a processor configured to:
control the display to display a plurality of polygonal menu items,
control the inputter to receive a user input selecting a polygonal menu item among the plurality of polygonal menu items,
select a first polygonal menu item among the plurality of polygonal menu items based on the user input,
determine a first source image, from among a plurality of source images, to be used to generate a highlight image surrounding the first polygonal menu item based on a shape of the first polygonal menu item,
generate a first highlight configuration element corresponding to a first side of the first polygonal menu item by magnifying the first source image along a length of the first side;
generating a second highlight configuration element corresponding to a second side of the first polygonal menu item by rotating the first source image according to a direction of the second side and magnifying the first source image along a length of the second side,
generate the highlight image based on the first highlight configuration element and the second highlight configuration element, control the display to display the highlight image surrounding the first polygonal menu item, and
in response to a user input selecting a second polygonal menu item among the plurality of polygonal menu items, no longer control the display to display the highlight image surrounding the first polygonal menu item.

8. The display apparatus as claimed in claim 7, wherein highlight configuration elements at sides of the polygonal menu item facing each other are generated from a same source image, from among the plurality of source images, when the polygonal menu item has symmetry.

9. The display apparatus as claimed in claim 7, wherein the processor, when a shape of the first polygonal menu item is a square, is further configured to generate the highlight image by generating a third highlight configuration element corresponding to a third side of the first polygonal menu item and a fourth highlight configuration element corresponding to a fourth side of the first polygonal menu item using the first source image, and generate highlight configuration elements at corners of the polygonal menu item using a second source image.

10. The display apparatus as claimed in claim 9, wherein the processor is further configured to generate the highlight image by generating the third highlight configuration element corresponding to the third side of the first polygonal menu item by magnifying the first source image and rotating the first source image according to a direction of the third side, and generating the fourth configuration element corresponding to the fourth side of the first polygonal menu item by magnifying the first source image and rotating the first source image according to a direction of the fourth side.

11. The display apparatus as claimed in claim 7, wherein the processor, when a shape of the first polygonal menu item is a rectangle, is further configured to generate the highlight image by generating a third highlight configuration element corresponding to a third side of the first polygonal menu item and a fourth highlight configuration element corresponding to a fourth side of the first polygonal menu item using the first source image, and generate highlight configuration elements at corners of the polygonal menu item using a second source image.

12. The display apparatus as claimed in claim 11, wherein the processor is further configured to generate the highlight image by generating the third highlight configuration element corresponding to the third side of the first polygonal menu item by magnifying the first source image and rotating the first source image according to a direction of the third side, and generating a fourth highlight configuration element corresponding to the fourth side of the first polygonal menu item by magnifying the first source image and rotating the first source image according to a direction of the fourth side.

* * * * *